H. L. DUXSTAD.
HAY FORK.
APPLICATION FILED AUG. 2, 1912.
1,046,567.
Patented Dec. 10, 1912.
2 SHEETS—SHEET 2.
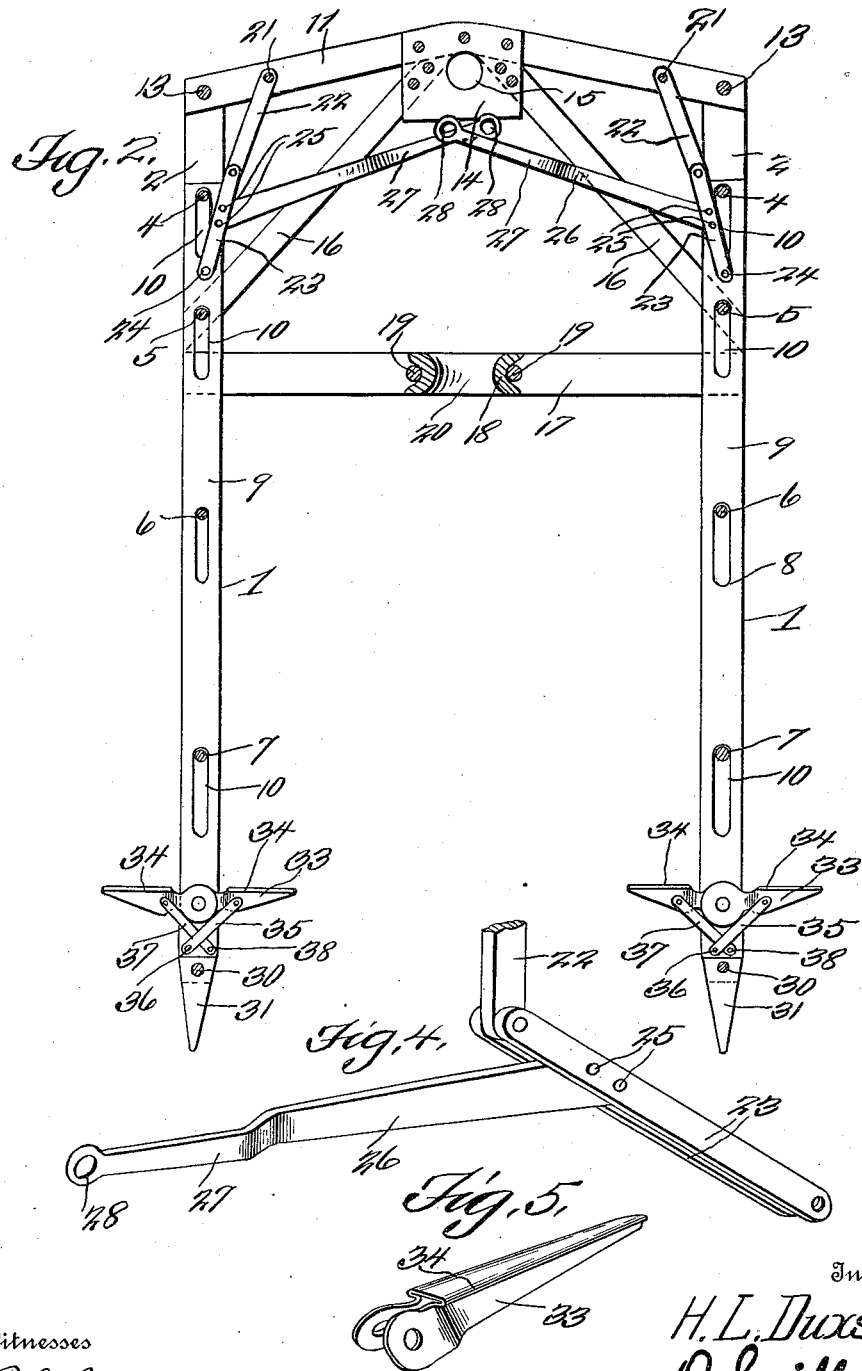
Witnesses
Robe Meyer.
Francis T. Powell.
Inventor
H. L. Duxstad,
By D. Swift & Co.
his Attorneys
COLUMBIA PLANOGRAPH CO., WASHINGTON, D. C.

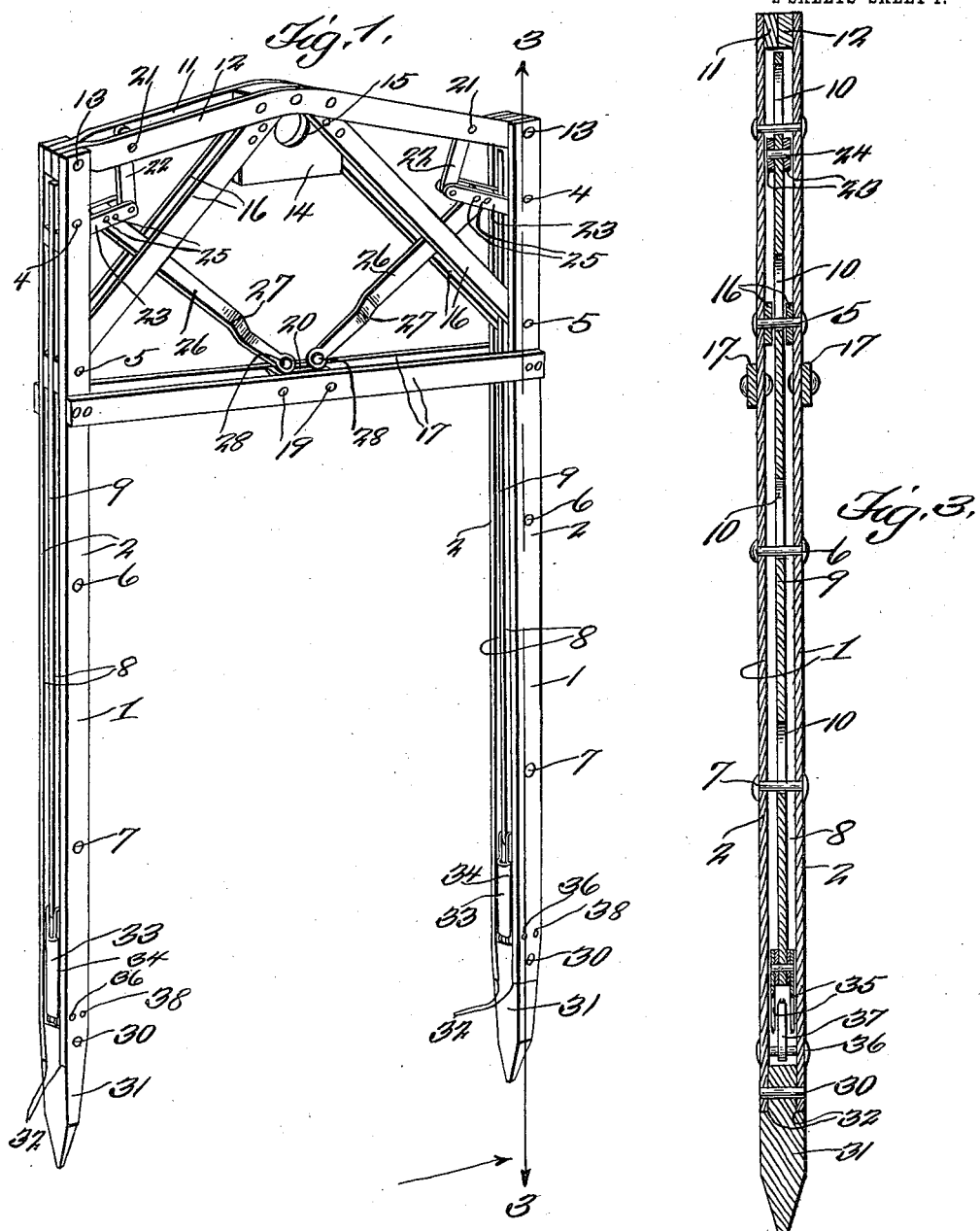

UNITED STATES PATENT OFFICE.

HENRY L. DUXSTAD, OF CAMBRIDGE, WISCONSIN.

HAY-FORK.

1,046,567.

Specification of Letters Patent.   Patented Dec. 10, 1912.

Application filed August 2, 1912.   Serial No. 712,920.

*To all whom it may concern:*

Be it known that I, HENRY L. DUXSTAD, a citizen of the United States, residing at Cambridge, in the county of Dane and State of Wisconsin, have invented a new and useful Hay-Fork; and I do hereby declare the following to be a full, clear, and exact description of the invention, such as will enable others skilled in the art to which it appertains to make and use the same.

This invention relates to a new and useful hay fork.

As one of the objects of the invention, it is the aim to provide an improved device of this nature, having novel, simple, desirable and practical features of construction.

The features of construction are hereinafter set forth, shown in the drawings and claimed.

In the drawings:—Figure 1 is a view in elevation of the improved fork, constructed in accordance with the invention. Fig. 2 is a sectional view, showing the barbs as extended laterally from the tines. Fig. 3 is a sectional view on line 3—3 of Fig. 1. Fig. 4 is a detail perspective view of a portion of the fork. Fig. 5 is a detail view of one of the barbs 33.

Referring to the drawings 1 designates the tines, which are constructed of two blades of metal 2, which are riveted together by the rivets 4, 5, 6 and 7, in such wise as to form an intervening space 8, in which the slide bars 9 are vertically movable. The slide bars are provided with slots 10, through which the rivets 4, 5, 6 and 7 extend, thereby constituting the guides for the bars.

The tines at their upper portions are connected by the bars 11 and 12, as at 13. Riveted between the bars 11 and 12 is a reinforcing plate 14 having an aperture 15, which is adapted to enable any suitable means (not shown) carried by a car or carriage (not shown) operating on a track (not shown) to be connected to the fork, whereby the fork may be raised and lowered. Connecting the reinforcing plate 14 to the tines are spaced apart braces 16. Braces 16 are connected to the tines by the rivets 5. Below the bars 11 and 12 and connecting the tines is a pair of additional bars 17, which are spaced apart by the block 18 and the rivets 19. The block 18 is provided with an opening 20. Pivoted at 21 between the bars 11 and 12 are two links 22, to the lower ends of which the links 23 are pivoted. The links 23 are in turn pivoted at 24 to the upper ends of the slide bars. Fixed rigidly to and between each pair of links 23 at 25 is a lever arm 26. The links 23 extend beyond where they are fixed to the lever arms, in order to pivotally connect to the links 22. The lever arms are provided with offset portions 27 (which are supplied with apertures 28) in order to freely pass one another, when operated by the cable 29, which passes through the aperture 20 and the block 18.

Fastened between the lower ends of the tine bars or blades by the rivets 30 are V-shaped blocks or piercing points 31. These piercing points are recessed at 32 to receive the tine bars or blades, as shown. Pivoted to the lower ends of the slide bars are the barbs 33, which may be constructed of any suitable material, preferably sheet metal, bent upon itself as shown. Where the sheet metal of the barbs is bent upon itself lateral shoulders 34 are formed, which blend to the points of the barbs. Connected to one barb of each tine is a pair of links 35, which in turn is pivoted at 36 between the tine bars or blades, while connected to the other barb of each tine is a single link 37, which passes between the links of each pair of links 35. The single links are pivoted at 38 between the tine bars or blades, as shown.

Upon examining the drawings it will be seen that when the lever arms are thrown downwardly, the barbs are closed. When the barbs are in such positions, the fork is forced in the hay sufficiently to gather as big a quantity as possible. The lever arms are then thrown upwardly, which in turn lower the slide bars, thereby throwing the barbs laterally of the tines, so as to cause the hay to adhere to the fork. The fork is adapted to then be raised to the desired elevation, after which the cable, which is connected to the lever arms, is pulled, thereby operating the lever arms downwardly, which will cause the barbs to again close, which will permit the hay to fall from the fork.

In the drawings there is disclosed one form only of the invention, but in practical fields this form may necessitate alterations, to which the patentee is entitled, provided the alterations are comprehended within the scope of what is claimed.

The invention having been set forth, what is claimed as new and useful is:—

1. In a hay fork, a pair of tines, each constructed of a pair of tine blades spaced apart and riveted together and terminating in points at their lower ends, slide bars slidable between the tine blades and provided with slots to receive the rivets of the tine blades, barbs pivoted to the lower end of each slide bar and provided with link connections to the tine blades, transverse brace bars, connecting the tines, pairs of diagonal brace bars bracing the tines relative to the upper transverse brace bars, toggle link connections connecting the upper ends of the slide bars and the upper transverse brace bars, and lever arms carried by the toggle links and guided between the diagonal brace bars for operating the toggle links and the slide bars.

2. In a hay fork, a pair of tines, each constructed of a pair of tine bars spaced apart and riveted together, pointed members having recesses in which the lower ends of the tine blades are riveted, slide bars slidable between the tine blades and provided with slots to receive the rivets of the tine blades, barbs having lateral portions blending to the points of the barbs, the barbs being pivoted to the lower end of each slide bar and provided with link connections to the tine blades, transverse brace bars, connecting the tines, pairs of diagonal brace bars bracing the tines relative to the upper transverse brace bars, toggle link connections connecting the upper ends of the slide bars and the upper transverse brace bars, and lever arms carried by the toggle links and guided between the diagonal brace bars for operating the toggle links and the slide bars.

In testimony whereof I have signed my name to this specification in the presence of two subscribing witnesses.

HENRY L. DUXSTAD.

Witnesses:
 ROHE MEYER,
 ROBERT A. BOSWELL.

---

Copies of this patent may be obtained for five cents each, by addressing the "Commissioner of Patents, Washington, D. C."